UNITED STATES PATENT OFFICE.

CARL FUNK, OF CHARLOTTENBURG, ASSIGNOR TO HUGO FUNK, OF BERLIN, GERMANY.

PROCESS OF FERMENTING.

SPECIFICATION forming part of Letters Patent No. 471,309, dated March 22, 1892.

Application filed May 25, 1891. Serial No. 394,017. (No specimens.)

*To all whom it may concern:*

Be it known that I, CARL FUNK, a subject of the King of Prussia, German Emperor, and a resident of Charlottenburg, Kingdom of Prussia, German Empire, have invented an Improved Method of Fermenting Mash, Dough, Wort, and the Like, of which the following is a full and exact specification.

My invention relates to a new method to cause the fermentation of mash, dough, and the like; and the object is to accelerate the fermenting process.

For a long time experiments have been made with mash to facilitate fermentation to set in, and some time ago phosphoric acid was thought to solve the question. However, it not rightly proved a success, the expectations rather being disappointed for this reason: Calcium, magnesia, and ferric oxide compounds, which form parts of mash, are rendered less soluble in the presence of phosphoric acid. It therefore is evident that this must have been the impediment in the progress of fermentation. The deficiency here pointed out will be overcome by replacing the phosphoric acid by glycero-phosphoric acid. This compound is qualified to keep the lime, magnesia, and ferric oxide in the state of solution, which accounts for the good results derived from the application of the same. I may either add to the substances to be fermented—as mash, wort, dough, &c.—the glycero-phosphoric acid alone for itself or in combination with the mineral ingredients of yeast, which are salts containing sulphur, phosphorus, potassium, and magnesium, in order to insure thorough fermentation and the destruction of the noxious by-fermentations created by the formation of certain sporules and molds, and also to produce pure ferments.

In carrying my invention into effect I mix one hectoliter of the substance to be fermented—such as mash, dough, wort, or the like—up with one hundred grammes of glycero-phosphoric acid, and, if thought requisite, also with mineral nutritive salts, such containing sulphur, phosphorus, potassium, and magnesium, according to need.

Instead of glycero-phosphoric acid proper I may, of course, apply its compounds as well, such as glycero-pyrophosphoric acid, glycero-metaphosphoric acid, and similar, which all may be ranked under the group of glycero-phosphoric acids.

Having now fully described the nature of my invention, what I desire to secure by Letters Patent of the United States is—

1. The process of fermenting, consisting in adding to a fermentable substance glycero-phosphoric acid and fermenting the mixture, as set forth.

2. The process of fermenting, consisting in adding to a fermentable substance glycero-phosphoric acid and mineral ingredients of yeast and fermenting the mixture, as set forth.

In testimony whereof I have signed this specification in the presence of two subscribing witnesses.

CARL FUNK.

Witnesses:
   FR. SPERLING,
   W. HAUPT.